(12) United States Patent
DeRosa (10) Patent No.: US 8,151,300 B2
(45) Date of Patent: Apr. 3, 2012

(54) SMART AUDIO GUIDE SYSTEM AND METHOD

(75) Inventor: Peter DeRosa, Concord, MA (US)

(73) Assignee: Cox Communications, Inc., Atlanta, GA (US)

( * ) Notice: Subject to any disclaimer, the term of this patent is extended or adjusted under 35 U.S.C. 154(b) by 824 days.

(21) Appl. No.: 10/524,682

(22) PCT Filed: Aug. 6, 2003

(86) PCT No.: PCT/US03/24552
§ 371 (c)(1),
(2), (4) Date: Feb. 10, 2006

(87) PCT Pub. No.: WO2004/017633
PCT Pub. Date: Feb. 26, 2004

(65) Prior Publication Data
US 2006/0236340 A1    Oct. 19, 2006

Related U.S. Application Data

(60) Provisional application No. 60/403,799, filed on Aug. 15, 2002.

(51) Int. Cl.
G06F 3/00 (2006.01)
G06F 13/00 (2006.01)
H04N 5/445 (2011.01)

(52) U.S. Cl. .......................................... 725/39; 725/46

(58) Field of Classification Search .................... 725/39, 725/46; 704/275
See application file for complete search history.

(56) References Cited

U.S. PATENT DOCUMENTS

| 5,640,484 | A | 6/1997 | Mankovitz |
| 5,751,228 | A | 5/1998 | Kamiya et al. |
| 6,341,195 | B1 | 1/2002 | Mankovitz et al. |
| 6,654,721 | B2 * | 11/2003 | Handelman .................... 704/270 |
| 7,107,271 | B2 * | 9/2006 | Aoki et al. ...................... 707/10 |
| 7,328,159 | B2 * | 2/2008 | Chang et al. .................. 704/275 |
| 7,370,343 | B1 * | 5/2008 | Ellis ............................... 725/58 |
| 2002/0010918 | A1 | 1/2002 | Mankovitz et al. |
| 2002/0088010 | A1 | 7/2002 | Dudkiewicz |
| 2002/0100046 | A1 | 7/2002 | Dudkiewicz |
| 2002/0113895 | A1 * | 8/2002 | Takagi et al. ................. 348/569 |
| 2003/0105639 | A1 * | 6/2003 | Naimpally et al. ........... 704/276 |
| 2003/0126600 | A1 | 7/2003 | Heuvelman |
| 2004/0068552 | A1 * | 4/2004 | Kotz et al. ..................... 709/218 |

FOREIGN PATENT DOCUMENTS

| EP | 1 079 615 A | 2/2001 |
| EP | 03 78 8332 | 11/2006 |
| WO | WO 00/11869 A | 3/2000 |
| WO | WO 02/078339 A | 10/2002 |
| WO | WO 03/094508 A | 11/2003 |

\* cited by examiner

Primary Examiner — Kieu Oanh T Bui
Assistant Examiner — Nnenna Ekpo
(74) Attorney, Agent, or Firm — Merchant & Gould (57) ABSTRACT

A smart audio guide system for use in conjunction with an interactive content distribution system is disclosed. The smart audio guide system includes a recommendation engine for providing a customized viewing-recommendations list for a viewer subsystem based upon the programming available from an interactive content distribution system and a customized viewing profile developed for the viewer subsystem. In response to one or more predetermined conditions, a smart guide actuator activates a processing unit, which is used to implement the smart audio guide system functions, which include causing a plurality of smart audio guide audio clips corresponding to the customized viewing-recommendations list to be uttered in a predetermined mode at the viewer subsystem.

19 Claims, 3 Drawing Sheets

SMART AUDIO GUIDE SYSTEM AND METHOD

CROSS-REFERENCE TO RELATED APPLICATIONS

This application is based upon and claims priority from U.S. provisional patent application Serial No. 60/403,799, filed 15 Aug. 2002,entitled "A SMART AUDIO GUIDE SYSTEM AND METHOD".

FIELD OF THE INVENTION

The present invention relates generally to electronic program guides (EPGs), and more specifically, to a Smart Audio Guide (SAG) system that is configured and operative to broadcast sound bites, i.e., SAG audio clips, that audibly identify programs or content recommend for viewing at a viewer subsystem.

BACKGROUND OF THE INVENTION

As the number of channels has increased with the proliferation of cable and satellite television distribution systems, a viewer has access to an unprecedented variety of programming content. However, this plethora of programming content has made it even more difficult for a viewer to find programming content that is consistent with the viewer's preferences.

To assist the viewer in finding programming content that is consistent with the viewer's preferences, content distribution systems have created electronic program guides (EPGs). An EPG provides a electronic tool that is intended to simplify the viewer's lot in life by ostensibly providing an overview of programming content in a manageable and comprehensible format. A representative description of an EPG can be found in U.S. Pat. No. 5,630,119 entitled SYSTEM AND METHOD FOR DISPLAYING PROGRAM LISTINGS IN AN INTERACTIVE ELECTRONIC PROGRAM CONTROL GUIDE. However, as anyone has used an EPG is aware, navigation through and use of an EPG is cumbersome in itself. An EPG provides a visual display of programming content that can be overwhelming at times. In addition, EPGs can be difficult to read on small televisions. In addition, since an EPG is entirely a visual display that contains a substantial amount of information in a small space, it may be difficult to read for people with poor eyesight, particularly if a viewer does not happen to have his/her glasses readily at hand. In addition, a visual display is not effective for that percentage of the population that is illiterate or which possess below par reading skills.

A need exists to provide programming information in a manner that readily apprises the viewer of the programming content available thereto, and more particularly, that viewing content that is consistent with the viewer's preferences. Such programming information should be provided to viewers as audio information to overcome the aforementioned deficiencies attributable to the visual displays of available programming provided by EPGS.

SUMMARY OF THE INVENTION

An object of the present invention is to provide a smart audio guide system and method that is operative to provide smart audio guide audio clips at a viewer subsystem corresponding to a customized viewing-recommendations list for the viewer subsystem that verbally identify programs or content recommended for viewing at the viewer subsystem.

This and other objects are achieved by a smart audio guide system according to the present invention for use in conjunction with an interactive content distribution system that includes a distribution head-end that makes programming available for viewing on a video display device at a viewer subsystem, the viewer subsystem including an audio unit to provide audio for the video display unit, the smart audio guide system comprising a recommendation engine for providing a customized viewing-recommendations list for the viewer subsystem based upon the programming available from the interactive content distribution system and a customized viewing profile developed for the viewer subsystem, a processing unit configured and operative to implement the smart audio guide system functions, a smart audio guide audio package that includes at least a plurality of smart audio guide audio clips corresponding to the customized viewing-recommendations list, and a smart guide actuator that is configured and operative in response to one or more predetermined conditions to activate the processing unit, wherein said processing unit is configured and operative to cause the plurality of smart audio guide audio clips to be uttered in a predetermined mode at the viewer subsystem via the audio unit when activated to identify programs recommended for viewing at the viewer subsystem based upon the customized viewing-recommendations list.

BRIEF DESCRIPTION OF THE DRAWINGS

A more complete understanding of the present invention and the attendant features and advantages thereof may be had by reference to the following detailed description of the invention when considered in conjunction with the accompanying drawings wherein:

FIG. 2A1 illustrates an audio package for the preferred embodiment of the smart audio guide system depicted in FIG. 2A.

FIG. 2B1 illustrates an audio package for the preferred embodiment of the smart audio guide system depicted in FIG. 2B.

DETAILED DESCRIPTION OF PREFERRED EMBODIMENTS OF THE INVENTION

Figure 1:
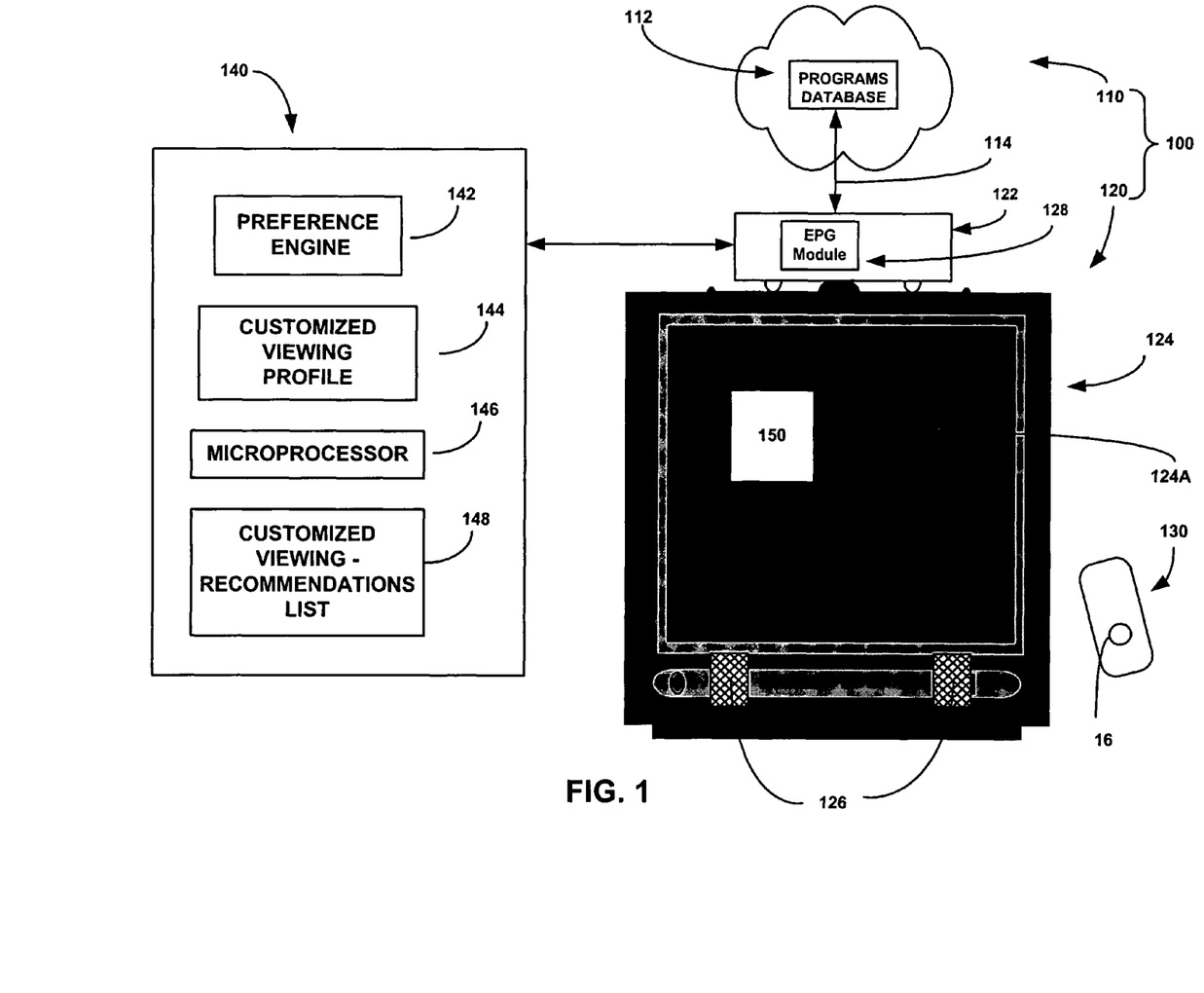
FIG. 1 illustrates a representative interactive content distribution system for providing programming to remote viewer subsystems.

Referring now to the drawings wherein like reference numerals identify corresponding or similar elements throughout the several views, FIG. 1 illustrates a representative content distribution system 100 that includes a distribution head-end 110 (program/content provider) and a viewer subsystem 120. The content distribution system 100 is typically a satellite and/or cable content distribution system that is configured to distribute viewing content, i.e., programs, to multiple viewer subsystems, one of which is represented by the viewer subsystem 120, via a distribution link 114 (e.g., cable, satellite dish, antenna).

In addition to the hardware and/or software (resources) required to distribute content/programs to multiple viewer subsystems, the distribution head-end 110 also includes a programs or content database 112 comprising records containing information regarding each of the programs/content distributed by and/or available from (in the case of pay-for-view or video-on-demand content/programs) the distribution head-end 110. Each program record includes, at a minimum, information regarding the characteristics of the content, e.g., program name/title, the scheduled time(s) that the program may be viewed (for scheduled programming and pay-for-view content), and the channel(s) for viewing the program/content. Program records typically can also include other information such as the personalities, e.g., actors and/or actresses, appearing in the programs, the networks associated with the viewing channels, whether the programs include closed captioning and/or stereo audio features, and content synopses for each of the programs. The program records comprising the programs database 112 are available to the viewer subsystems 120 via the resources of the distribution head-end 110 as discussed in further detail below.

Each viewer subsystem 120 comprises an interface device 122 such as a set-top box or receiver that interconnects the distribution head-end 110 and the viewer subsystem 120 via the distribution link 114 to provide the viewer subsystem 120 with access to the programs distributed by and/or available from the distribution head-end 110, and a video display device 124, which includes a display screen 124A), such as a television set connected to the interface device 122 and configured and operative to display for viewing programs distributed by and/or available from the distribution head-end 110. As illustrated in FIG. 1, the display device 124 includes an integral audio unit 126, e.g., stereo speakers, to provide audio concurrently with any displayed video program/content. One skilled in the art will appreciate that the audio unit 126 could also be an audio system that is separate and distinct from the display device 124, e.g., a stereo system integrated in combination with a television set, or could be an audio system that is integrated in combination with an integral audio unit of the display device 124.

The content distribution system 100 further includes an interactive electronic program guide (EPG) module 128 that is typically incorporated in the interface device 122 at the viewer subsystem 120, as illustrated in FIG. 1. Alternatively, the EPG module 128 can be incorporated in the video display device 124, or provided as a separate component of the viewer subsystem 120. A viewer control unit 130 such as a handheld, IR remote control is also provided as part of the viewer subsystem 120 and is configured and operative to allow a viewer to interact with the interface device 122, e.g., to effect volume control, channel changes with respect to the video display device 124, and to interact with the EPG module 128, e.g., vertical scrolling (program name/title—channel changes) and/or horizontal scrolling (time slot changes) to view current and future program listings, program selection for viewing and/or recording, etc.

The EPG module 128 is configured and operative to interact with the distribution head-end 110, i.e., the programs database 112, in response to a viewer's operation of the viewer control unit 130 to provide a real-time listing of various programs/program titles, categorized into structured time slots, that are displayed at the viewer subsystem 120 via the video display device 124 in a predetermined "program grids" format (the "EPG display", which may occupy all or a part of the display area of the video display device 124) consistent with the viewer's operation of the viewer control unit 130. See, e.g., U.S. Pat. No. 5,630,119,SYSTEM AND METHOD FOR DISPLAYING PROGRAM LISTINGS IN AN INTERACTIVE ELECTRONIC PROGRAM GUIDE.

The EPG module 128 is interactively connected to the programs database 112 maintained at the distribution head-end 110 via the distribution link 114. This interactive connection allows the EPG module 128 to extract information from the pertinent program records maintained in the programs database 112 to automatically generate in real time the EPG display any time the viewer invokes the EPG module 128 via the viewer control unit 130, and/or to continuously update the EPG display as the viewer scrolls horizontally and/or vertically through the EPG display. The EPG module 128 is further configured and operative to interact with the interface device 122 to implement any programming selected from the EPG display by the viewer using the viewer control unit 130.

For purposes of the present invention, the content distribution subsystem 100 further includes a recommendation subsystem 140 that is configured and operative to create and maintain a customized viewing profile for the viewer subsystem 120 and, using the customized viewing profile, to generate a viewing recommendations list for the viewer subsystem 120 based upon the program records of the programs database 112 maintained at the distribution head-end 110. As used herein, the terminology "customized viewing profile" encompasses one or more viewing profiles, depending upon the number of viewers at any particular viewer subsystem 120, i.e., each viewer at any particular viewer subsystem 120 would have his/her own customized viewing profile. Recommendation subsystems for creating and maintaining customized viewing profiles and generating viewing recommendation lists are well known in the art—see, for example, U.S. Pat. Nos. 6,425,128, 5,767,893, 5,717,814, 5,619,247, 5,534,911, 5,444,999, 5,434,678, 5,410,344, and 5,223,924. See also U.S. Patent Application Publication No. 2002/0075320. While the recommendation subsystem 140 can be maintained at the distribution head-end 110, the recommendation subsystem 140 is preferably part of the viewer subsystem 120, e.g., an element of the interface device 122.

A representative recommendation subsystem 140 generally includes a preference engine 142, a customized viewing profile 144, a microprocessor 146, and a customized viewing-recommendations list 148. The preference engine 142 is configured and operative, e.g., a software module of the type known to those skilled in the art, to derive and, if relevant, maintain or update, a customized viewing profile 144 using one, two, or a combination of the three basic profiling methods: implicit profiling, explicit profiling, and feedback profiling.

An implicit profiling method relies upon the content or program viewing history at any particular viewer subsystem 120 to create a customized viewing profile based upon the program/content viewing history at such particular viewing subsystem 120. That is, the preference engine 142 maintains a record of programs viewed at the viewer subsystem 120, e.g., by recording channels selected via the viewer control unit 130, or alternatively the tuner of the interface device 122 or the display device 124, and from this record of viewed programs generates the customized viewing profile 144. Explicit profiling methods derive customized viewing profiles 144 based upon questionnaires answered by a viewer at the viewer subsystem 120 where such questionnaires include explicit questions about the viewer's program/content likes and dislikes. The feedback profiling method generates customized viewing profiles 144 based upon programs that have been viewed and rated by the viewer.

Typically, one of the foregoing profiling methods (or any other profiling method known to those skilled in the art) is used to create an initial customized viewing profile 144 and then the implicit profiling method is used to periodically update the customized viewing profile 144 based upon programs viewed since the creation or last update of the customized viewing profile 144. By whatever method is used, including those known to one of ordinary skill in the art but not explicitly described herein, the customized viewing profile 144 represents the viewing preferences of any particular viewing subsystem 120, e.g., types of preferred programs or content such as sporting events, soap operas, sit-coms, movies (by type, e.g., action, suspense, drama, comedy), etc.

The microprocessor 146 of the recommendation subsystem 140 is configured and operative to retrieve relevant program records from the programs database 112 maintained at the distribution head-end 110, which indicate programs/content available for viewing, and to correlate the customized viewing profile 144 with the relevant program records retrieved from the programs database 112 to generate a customized list of viewing recommendations 148 for the viewer subsystem 120. Typically the customized viewing-recommendations list 148 represents a non-biased hierarchical rating of program/content viewing recommendations, i.e., an ordered, ranked list of "n" program/content recommendations that is based solely upon the customized viewing profile 144 (where "n" represents the number of program/content recommendations, e.g., five (5)) so that a viewer can expeditiously and effectively select a program for viewing—see also discussion below).

It is also known in the art, however, to modify the customized viewing-recommendation list 148 so that the customized viewing-recommendations list 148 either: (1) includes one or more "sponsored" recommendations; or (2) is rank ordered in accordance with one or more predetermined bias or weighting factors. Option (1) involves the inclusion in the customized viewing-recommendations list 148 of one or more programs that are effectively sponsored by the distribution head-end 110, i.e., such sponsored programs would not necessarily have been included in a non-biased hierarchical customized viewing-recommendations list 148 based upon a customized viewing profile 144. For example, sponsored programs may include "premium" programs/content (e.g., pay-per-view programs) that result in increased revenues for the distribution head-end 110. See, e.g., U.S. Pat. No. 6,425,128.

Under option (2) the content of the customized viewing-recommendations list 148 is based solely upon the customized viewing profile 144, but the rank ordering of this customized viewing-recommendations list 148 has been modified in accordance with predetermined biasing or weighting factors. That is, these biasing or weighting factors produce a rank ordering of the customized viewing-recommendations list 148 that is different from the non-biased hierarchical rank ordering. See, e.g., U.S. nonprovisional patent application Serial No. 10/204,842, filed 23 Aug. 2002, entitled RECOMMENDATION-BASED ELECTRONIC PROGRAM GUIDES WITH USER-IMPERCEPTIBLE PREFERENCES.

Regardless of how the customized viewing-recommendations list 148 is generated, it is ultimately used to provide a display of customized viewing recommendations at the viewer subsystem 120. Preferably, the customized viewing-recommendations list 148 is formatted as a graphic recommendation menu 150 that is displayed via the display device 124, which allows a viewer to select one of the recommendations from the graphic recommendation menu 150 for viewing using the viewer control unit 130. For example, the microprocessor 146 of the recommendation subsystem 140 can be configured and operative to generate the graphical recommendation menu 150 comprising the viewing-recommendations listing 148 and transmit such graphical menu to the display device 124 for presentation. Alternatively, the microprocessor 146 can forward the customized viewing-recommendations list 148 to the interface device 122, which is operative to transform the listing 148 into the graphical recommendation menu 150 that is displayed via the display device 124. See, e.g., U.S. Patent Application Publication No. US2002/0075320 A1. The number "n" of program selections provided in the customized viewing-recommendations list 148 is also based upon the display size of the graphical recommendation menu 150, i.e., number of program selections or "program grids" displayed via the graphical recommendation menu 150 should be readily viewable by the viewer, e.g., no crowding of program selections.

The graphical recommendation menu 150 embodying the customized viewing-recommendations list 148 can be displayed as a full screen display, e.g., see FIG. 1 of U.S. Pat. No. 6,425,128, or as a partial screen display with a window for continued viewing of a program (a picture-within-a-picture), or as a compact guide display of the type described and claimed in U.S. Nonprovisional Patent Application Serial No. 10/204,841, filed 25 Aug. 2002, entitled METHODS AND SYSTEMS FOR DISPLAYING RECOMMENDED CONTENT ALTERNATIVES. Displaying the graphical recommendation menu 150 as a compact guide display provides the advantage that the viewer may continue to watch a displayed program while concomitantly viewing the graphical recommendation menu 150 to determine if there is alternative content that the viewer wishes to view. When the graphical recommendation menu 150 is displayed using the compact guide display format, the compact guide display can be opaque, translucent, or transparent. The graphical recommendation menu 150 can be automatically displayed upon activation of the video display device 124 and/or can be selected for viewing at any time using the viewer control unit 130 as is known to those skilled in the art and/or in other ways known to those skilled in the art.

The recommendation subsystem 140 operates in the background when the display device 124 is active, i.e., operation of the recommendation subsystem 140 is transparent to viewers at the viewer subsystem 120, to continually update the customized viewing-recommendations list 148, and concomitantly the graphical recommendation menu 150, as the programming available from the distribution head-end 110 changes as a result of elapsed time. In this manner, an updated customized viewing-recommendations list 148 is available to generate a graphical recommendation menu 150 whenever the viewer activates this feature.

Referring now to the preferred embodiments of FIGS. 2A, 2B wherein like reference numerals indicate corresponding or similar elements throughout these views, smart audio guide (SAG) systems 10, 10' according to the present invention are configured and operative to broadcast sound bites, i.e., the SAG audio clips described in further detail below, identifying programs or content recommended for viewing at the viewer subsystem 120. Such sound bites are based upon the customized viewing-recommendations list 148 for the viewer subsystem 120. The SAG system 10, 10' according to the present invention is interactively connected to the recommendation subsystem 140 of the viewer subsystem 120 (either directly or via the interface device 122 as depicted in FIGS. 2A, 2B) so that the most current version of the customized viewing-recommendations list 148 is available to the SAG systems 10, 10', and accordingly, the broadcast sound bites are based upon the most current version of the customized viewing-recommendations list 148.

Figure 2A:
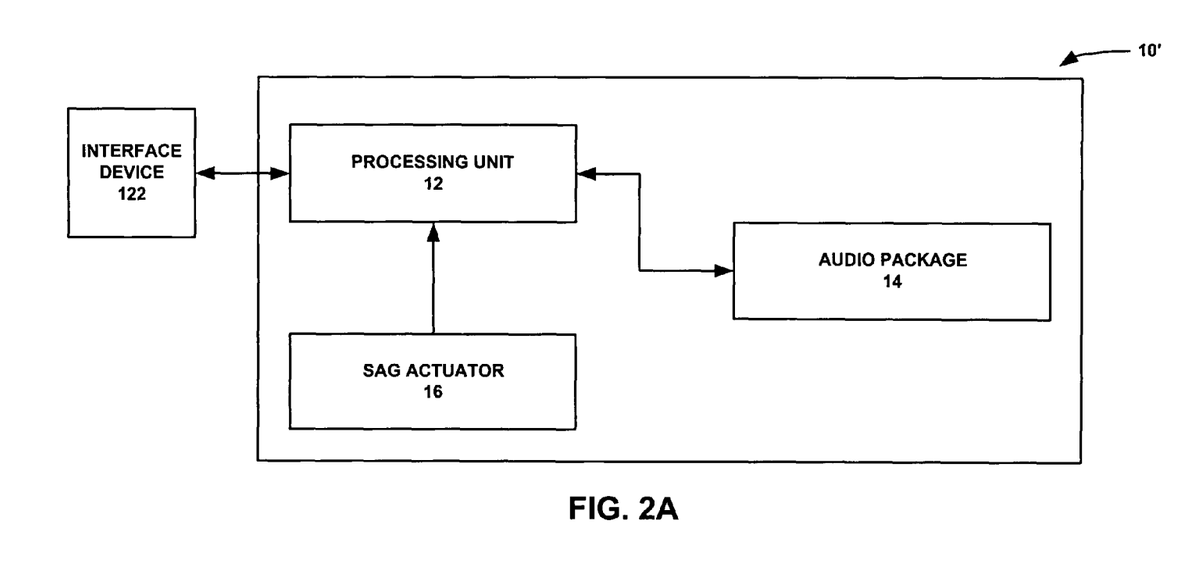
FIG. 2A illustrates one preferred embodiment of a smart audio guide system according to the present invention.
Figure 2A:
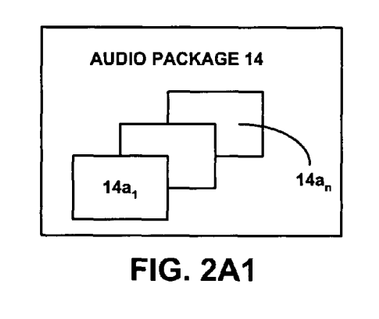

One preferred embodiment of the smart audio guide SAG system 10 according to the present invention is exemplarily illustrated in FIGS. 2A, 2A1 and comprises a processing unit 12, a SAG audio package 14, and a SAG actuator 16. The processing unit 12 is any suitable central processing unit, e.g., a microprocessor, that is configured and operative to implement and manage the functions of the SAG system 10 described herein. For this embodiment of the SAG system 10, the SAG audio package 14 comprises a plurality of SAG audio clips $14a_1, \ldots 14a_n$ (where "n" is a small number corresponding to the number of recommendations in the customized viewing-recommendations list 148) stored in or available through the SAG system 10 (see FIG. 2A1), e.g., RAM memory.

In this embodiment of the SAG system 10 according to the present invention, a SAG audio clip 14a is generated by the distribution head-end 110 for each unique program record stored in the programs database 112. These SAG audio clips 14a are stored in the corresponding program records maintained in the programs database 112 at the distribution head-end 110 and can be distributed in a data stream transmitted by the distribution head-end 110 to the viewer subsystem 120. Once the customized viewing-recommendations list 148 has been generated by the recommendation system 130 of the viewer subsystem 120, the processing unit 12 of the SAG system 10 is configured and operative to retrieve the audio package 14 comprising the relevant SAG audio clips 14a corresponding to the customized viewing-recommendations list 148 for the viewing subsystem 120. Retrieval of the SAG audio package 14 can be effected on a real-time basis, i.e., when the SAG system 10 is invoked or implemented at the viewer subsystem 120, or alternatively, the SAG audio package 14 can be retrieved and cached in the SAG system 10 for subsequent use. Retrieval may be effected by accessing the relevant program records in the programs database 112 at the distribution head-end 110 or intercepting and extracting the relevant program records from a data stream transmitted by the distribution head-end 110 to the interface device 122. In this embodiment, the distribution head-end 110 is responsible for generating and managing the SAG audio clips 14a comprising the audio package 14 for the SAG system 10 according to the present invention.

Figure 2B:
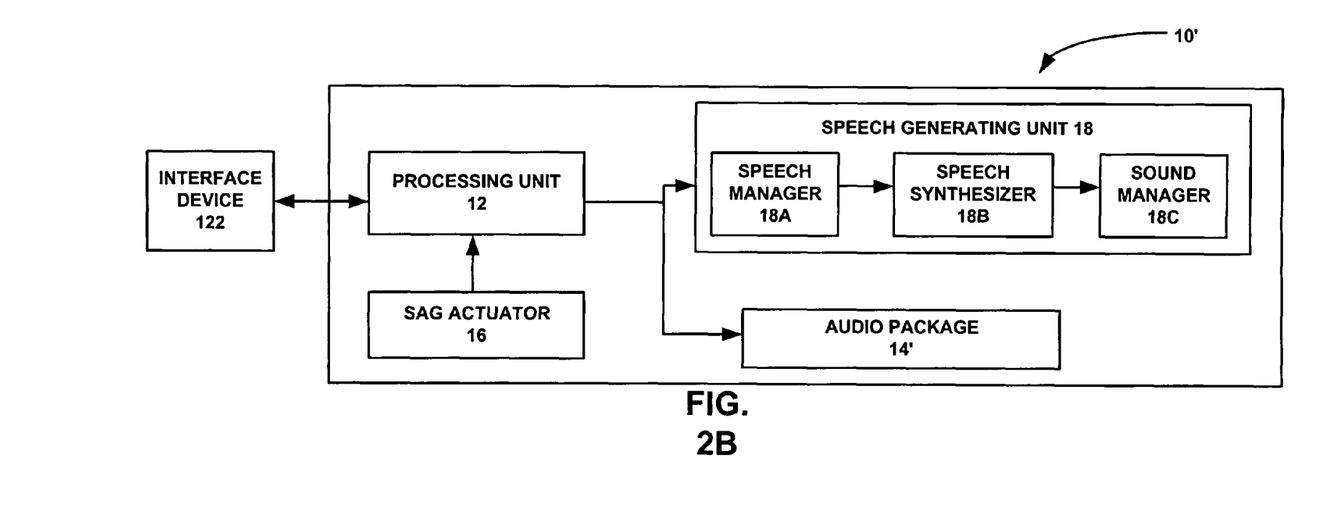
FIG. 2B illustrates another preferred embodiment of a smart audio guide system according to the present invention.
Figure 2B:
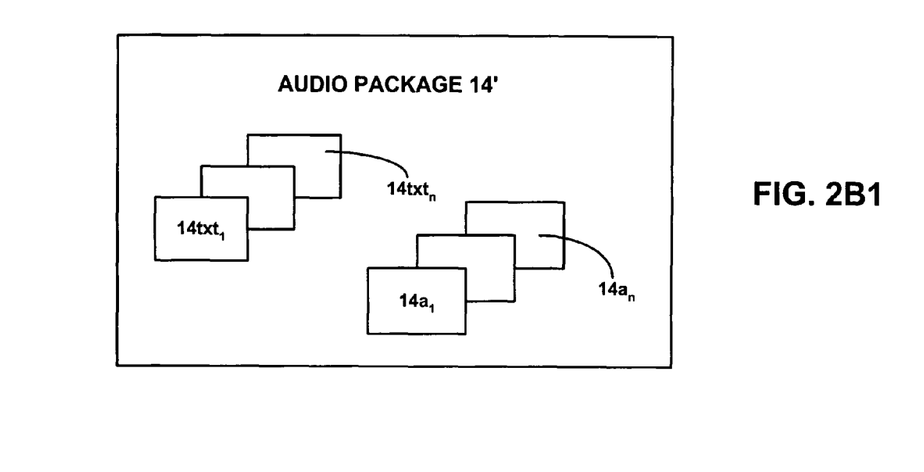

Another preferred embodiment of the SAG system 10' according to the present invention is depicted in FIGS. 2B, 2B1 and includes a speech generating unit 18 in addition to the processing unit 12, a SAG audio package 14', and the SAG actuator 16. For this embodiment of the SAG system 10, the SAG audio package 14' comprises a plurality of SAG text files $14txt_1, \ldots 14txt_m$ (where "n" is a small number corresponding to the number of recommendations in the customized viewing-recommendations list 148) stored in the SAG system 10 (see FIG. 2B1), e.g., RAM memory, that are converted to a plurality of corresponding SAG audio clips $14a_1, \ldots 14a_n$ using the speech generating unit 18. For this particular embodiment, the processing unit 12 is further configured and operative to produce these SAG text files 14txt from any of a variety of sources. For example, the SAG text files 14txt can be produced directly from the customized viewing-recommendations list 148 generated by the recommendation subsystem 140 at the viewer subsystem 120. Alternatively, the SAG text files 14txt can be indirectly produced by accessing the relevant program records in the programs database 112, or intercepting and extracting the relevant program records from a data stream transmitted by the distribution head-end 110 to the interface device 122. The SAG audio package 14' can be produced (and converted) on a real-time basis, i.e., as the SAG system 10' is invoked or implemented at the viewer subsystem 120, or alternatively, the SAG audio package 14' can be produced and cached for subsequent use at the viewer subsystem 120.

The speech generating unit 18 is a conventional element that is operative to generate SAG audio clips 14a from the corresponding SAG text files 14txt. For example, the speech generating unit 18 can comprise a speech manager 18A, a speech synthesizer 18B, and a sound manager 18C as exemplarily illustrated in FIG. 2B. The speech manager 18A is configured and operative to transmit the SAG text files 14txt to the speech synthesizer 18B. The speech synthesizer 18B contains executable code to manage all communications between the speech manager 18A and the sound manager 18C and includes built-in dictionaries and pronunciation rules to determine how to pronounce the SAG text files 14txt provided by the speech manager 18A. The speech synthesizer 18B can include one or more voices, e.g., male or female, adult or child, having different attributes (different speech channels) that can be selected for use at the viewer subsystem 120 using the speech manager 18A. Once corresponding SAG audio clips 14a have been generated as sound data by the speech synthesizer 18B from the SAG text files 14txt, these SAG audio clips 14a are either (i) immediately broadcast; or cached in the audio package 14' for subsequent broadcast. The sound manager 18C is configured and operative to broadcast the SAG audio clips 14a via the audio unit 126 of the display device 124 as appropriate.

Each SAG audio clip 14a of the SAG system 10,10' according to the present invention includes basic audio information that allows a viewer to ascertain "what" programs (name/title) are available for viewing (based upon the customized viewing-recommendations list 148 of the viewer subsystem 120) and 'where' such programs may be viewed, i.e., on which channel of the video display device 124. For example, SAG audio clips 14a may have a basic audio format wherein only the title and channel of the recommended program make up the broadcast sound bites: "Frasier—Channel 12" or "Gladiator—Channel 202".

However, this basic audio information may be supplemented by additional audio information so that the 'what' and 'when' are audibly provided in a more conventional format, e.g., a sentence format. For example, "Frasier is showing on Channel 12" or "Gladiator is showing on Channel 202" exemplify one version of a supplemented audio format for the SAG audio clips 14a. For this embodiment, standardized audio information, e.g., "is showing on", is used to expand the syntax of the SAG audio clips 14a.

The SAG system 10,10' according to the present invention is configured (via hardware, firmware, software, or combinations thereof) to operate in one or more modes ("how" the SAG audio clips 14a are used) under one or more predetermined conditions ("when" the SAG audio clips are uttered) via the SAG actuator 16. By way of example, the operating modes for the SAG system 10,10' can include: (1) uttering only the SAG audio clips 14a in response to one or more predetermined conditions; and (2) uttering the SAG audio clips 14a in concatenated combination, i.e., synchronization, with a visual presentation (via the display screen 124A of the video display device 124) of the customized viewing-recommendations list 150 in response to one or more predetermined conditions.

With respect to mode (2), the SAG audio clips 14a can be uttered in synchronization with the graphical recommendation menu 150 described above, or the SAG audio clips 14a can be uttered in synchronization with a conventional EPG display of the type described above. With respect to either of these options, the processing unit 12 is further operative to implement a focus frame in conjunction with the utterance of each SAG audio clip 14a so that the corresponding program grid in either the graphical recommendation menu 150 or the conventional EPG display is focused, e.g., by highlighting, blinking, contrasting colors, etc, during utterance of a SAG audio clip 14a. Mode (2) operation provides a visual reinforcement of the audio information provided by the utterance of the SAG audio clip 14a.

The predetermined conditions under which the SAG system 10,10' according to the present invention is invoked is governed by the SAG actuator 16. The SAG actuator 16 can be implemented as one or more sets of instructions and/or as a button on the viewer control unit 130 (see FIG. 1) and/or a separate control unit (not shown) that is specially adapted for use with the SAG system 10,10' according to the present invention. Operation of the SAG actuator 16 activates the processing unit 12, which is configured and operative cause the specific SAG audio clips 14a to be uttered via the audio unit 124A of the display device 124 in one of the operating modes described above, under one or more predetermined conditions. Such predetermined conditions can include, but are not necessarily limited to, initial activation of the video display unit 124 (turning the television set on), manual activation of the SAG actuator 16 by a viewer (see FIG. 1 wherein the SAG actuator 16 comprises a button of the viewer control unit 130), at the conclusion of a programming period, i.e., at the end of a scheduled program on the video display device 124, activation of the graphical recommendation menu 150, activation of the EPG display, and/or combinations of the foregoing.

For the embodiment of the SAG system 10 that is operative to broadcast the specific SAG audio clips 14 when the display device 124 is initially turned-on, at the conclusion of a specific programming period, activation of the graphical recommendation menu 150, and/or activation of the EPG display, the SAG actuator 16 comprises a set of instructions that implements the functionality described above. For the embodiment of the SAG system 10 that is operative to broadcast the specific SAG audio clips 14 at the viewer's discretion, the SAG actuator 16 comprises a button on the viewer control device 128 (or on a separate controller dedicated to the operation of the SAG system 10,10' according to the present invention) that activates the processing unit 12 when depressed.

Concomitant with the invocation or implementation of the SAG system 10,10', the SAG actuator 16 is operative to initiate the "mute" capability (either directly via the display device 124 or indirectly via the interface device 122) so that the audio associated with programming being displayed via the display device 124 is muted or temporarily shut off so as not to interfere with the utterance of the SAG audio clips 14a. After the specific SAG audio clips 14a have been uttered using either mode (1) or (2) as described above, the SAG actuator 16 is operative to disable the "mute" capability so that the audio associated with the programming being viewed is again available.

During utterance of any particular SAG audio clip 14a, the viewer may choose the program associated with the uttered SAG audio clip 14a by manually operating the viewer control unit 130 in the conventional manner. For example, to choose the movie "Gladiator" in response to the SAG audio clip 14a utterance that "Gladiator is showing on Channel 202", the viewer would sequentially depress the numbers "2", "0" and "2" on the viewer control unit 130 to select channel 202 as the channel displayed via the video display unit 124. The SAG system 10, 10' according to the present invention, however, can be adapted to facilitate the choice of a program for viewing in response to the utterance of any particular SAG audio clip 14a.

The processing unit 12 of the adapted SAG system 10,10' can be configured and operative to automatically activate the "select" button of the viewer control unit 130 (or the "select" button of a separate dedicated SAG controller) to correspond to the viewing channel associated with the particular SAG audio clip 14a being uttered. For example, if the SAG audio clip 14a announced that "Frasier is showing on Channel 12", the "select" button of the viewer control unit 130 would be automatically activated to correspond to channel 12, and depression of the "select" button would cause channel 12 to be displayed on the video display unit 124. Accordingly, to choose the program identified by the particular SAG audio clip 14a being uttered, the viewer need only depress the "select" button on the viewer control unit 130 and the chosen program will be displayed for viewing on the video display device 124.

Alternatively, the processing unit 12 of the adapted SAG system 10, 10' can be configured and operative to automatically activate one or more predetermined number buttons of the viewer control unit 130 (or the number buttons of a separate dedicated SAG controller) to correspond to the viewing channel associated with the particular SAG audio clip 14a being uttered. For example, if the SAG audio clip 14a announced "To view Frasier on Channel 12, press 1", the number "1" button of the viewer control unit 130 would be automatically activated to correspond to channel 12, and depression of the number 1 button on the viewer control unit 130 would cause channel 12 to be displayed on the video display unit 124. In this particular adaptation of the SAG system 10, 10' according to the present invention, the first "n" numbers of the viewer control unit 130 would be sequentially activated (where "n" corresponds to the number of programs identified in the customized viewing-recommendations list 148 for the viewer subsystem 120, and concomitantly, the number of SAG audio clips 14a), in synchronicity with the corresponding SAG audio clip 14a.

A variety of modifications and variations of the present invention are possible in light of the above teachings. It is therefore to be understood that, within the scope of the appended claims, the present invention may be practiced other than as specifically described herein.

What is claimed is:

1. A smart audio guide system for use in conjunction with a content distribution network of a content distributor that includes a distribution head-end to distribute programming available for viewing on a video display device at a viewer subsystem, the viewer subsystem including an audio unit to provide audio for the video display unit, the smart audio guide system comprising:

a recommendation system, coupled to the head-end and the viewer subsystem by a communications network, the recommendations system comprising:
a customized viewing profile;
a customized viewing recommendation list; and
a recommendation engine for providing the customized viewing-recommendations list for the viewer subsystem based upon programming data maintained at the distribution head of the content distributor and the customized viewing profile and viewer content selection history associated with a user of the viewer subsystem;

an audio generating system, disposed at and coupled to the head-end, the audio generating system comprising:
a smart audio guide audio package retrieved from the head end of the content distributor that includes at least a plurality of smart audio guide audio clips corresponding to each program included in the programming data maintained at the distribution head of the content distributor; and a smart guide actuator that is configured and operative in response to one or more predetermined conditions to activate the rendering of the smart audio guide audio clips and the customized viewing-recommendations list, wherein the plurality of smart audio guide audio clips are generated at the head-end of the content distributor by the audio generating system and are stored in a database at the head-end; and an interface device coupled to the viewer subsystem, the interface device implementing an electronic program guide smart audio guide system functions, wherein said interface device is configured and operative to cause the electronic program guide to display a recommended program listing at the viewer subsystem based upon the customized viewing-recommendations list, the interface device further configured to retrieve, from the audio generating system, smart audio guide audio clips corresponding to the programs in the recommended program listing, wherein the retrieved smart audio guide audio clips are uttered in a predetermined mode at the viewer subsystem via the audio unit when activated to identify the programs in the recommended program listing for viewing at the viewer subsystem based upon the customized viewing-recommendations list, and wherein the plurality of smart audio guide audio clips are uttered and a corresponding visual presentation of the information is modified respectively to synchronize the uttering of each of the plurality of smart audio guide audio clips with a corresponding visual presentation of a matching program in the recommended programming list.

2. The smart audio guide system of claim 1, wherein at least one of the plurality of smart audio guide audio clips corresponding to a recommended program of the customized viewing-recommendations list is generated by combining one or more audio clips identifying the recommended program and at least one standardized audio clip.

3. The smart audio guide system of claim 1, wherein:
the corresponding visual presentation is a graphical recommendation menu and
the interface device is further configured and operative to implement a focus frame that, upon each of the plurality of smart audio guide clips being uttered, visually focuses a corresponding program grid of the graphical recommendation menu, wherein the corresponding program grid is associated with a program identified by the smart audio guide audio clip.

4. The smart audio guide system of claim 1, wherein:
the corresponding visual presentation is an electronic program guide and
the interface device is configured and operative to implement a focus frame that visually focuses a corresponding program grid of the electronic program guide, wherein the corresponding program grid is associated with a program identified by the smart audio guide audio clip.

5. The smart audio guide system of claim 1 further comprising a speech generating unit, and wherein the smart audio guide audio package further comprises a plurality of smart audio guide text files;
and wherein the interface device is configured and operative to implement the speech generating unit to convert the plurality of smart audio guide text files into the plurality of smart audio guide audio clips.

6. The smart audio guide system of claim 1 wherein the viewer subsystem further includes a viewer control unit and wherein the smart audio guide actuator comprises a button on the viewer control unit, which when depressed, activates the interface device to cause the plurality of smart audio guide audio clips to be uttered in the predetermined mode at the viewer subsystem via the audio unit.

7. The smart audio guide system of claim 1 wherein the smart audio guide actuator comprises a set of instructions that activates the interface device to cause the plurality of smart audio guide audio clips to be uttered in the predetermined mode at the viewer subsystem via the audio unit when the video display device at the viewer subsystem is initially activated.

8. The smart audio guide system of claim 1 wherein the smart audio guide actuator comprises a set of instructions that activates the interface device to cause the plurality of smart audio guide audio clips to be uttered in the predetermined mode at the viewer subsystem via the audio unit at the conclusion of a programming period.

9. The smart audio guide system of claim 1 wherein the interface device is configured and operative to temporarily discontinue the audio associated with programming being displayed via the video display device at the viewer subsystem when the plurality of smart audio guide audio clips is being uttered in a predetermined mode at the viewer subsystem via the audio unit.

10. An apparatus adapted for use in an interactive content distribution system, the apparatus comprising:
a distribution head-end of a content distributor, comprising:
a programs database for maintaining programs for distribution;
a recommendation subsystem configured to access the programs database at the head-end of the content distributor over a communications network of the content distributor and to generate a customized viewing-recommendations list of programs from available programs maintained by the programs database at the head-end based upon a customized viewing profile and viewer content selection history associated with a user and maintained at the recommendation subsystem; and
an audio generating system, disposed at and coupled to the head-end, the audio generating system maintaining a smart audio guide audio package at the head end of the content distributor, the smart audio guide audio package includes at least a plurality of smart audio guide audio clips corresponding to each program included in programming data maintained at the distribution head of the content distributor, the audio generating system rendering the smart audio guide audio clips and the customized viewing-recommendations list;
an interface device coupled to the viewer subsystem, the interface device implementing an electronic program guide smart audio guide system functions; and
a viewer subsystem, coupled to the interface device, the viewer subsystem configured to retrieve the customized viewing-recommendations list from the recommendation subsystem at the distribution head-end and to render audiovisual signals associated with a program selection mechanism through a display and speakers,
wherein said interface device is configured and operative to cause the electronic program guide to display the customized viewing-recommendations list at the viewer subsystem based upon the customized viewing-recommendations list, the interface device further configured to retrieve, from the audio generating system, the smart audio guide audio clips corresponding to the programs in the customized viewing-recommendations list, wherein the retrieved smart audio guide audio clips are uttered in a predetermined mode at the viewer subsystem via the rendered audiovisual signals to identify the programs in the customized viewing-recommendations list for viewing at the viewer subsystem, and wherein the plurality of smart audio guide audio clips and a corresponding visual presentation of the programs in the customized viewing-recommendations list are synchronized.

11. The apparatus of claim 10, wherein the audiovisual signals include image representative signals associated with an electronic program guide (EPG) provided in said interface device of the content distributor and wherein the audiovisual signals are configured such that, upon rendering of each of the audio clips associated with the at least one recommended program, a portion of the EPG corresponding to the at least one recommended program becomes visually focused.

12. The apparatus of claim 10, wherein the audiovisual signals are adapted for presentation via a television.

13. The apparatus of claim 10, wherein programs and their respective audio clips are stored at a programs database at the head end of the content distributor.

14. The apparatus of claim 11, wherein normal presentation of the EPG is modified in response to the presence of recommended content within an EPG page.

15. The apparatus of claim 14, wherein an audio clip associated with recommended content is audibly rendered in response to the presence of recommended content displayed within said EPG page.

16. The apparatus of claim 15, wherein the audio clip associated with recommended content is audibly rendered in response to user manipulation of the displayed EPG to potentially recommended content.

17. The apparatus of claim 10, wherein in response to a user selection of a predefined graphical button each of a plurality of audio clips associated with recommended content is audibly rendered.

18. The apparatus of claim 10, further comprising a speech generating unit configured to provide audio data related to recommended content.

19. A method adapted for use in an interactive content distribution system, the method comprising:
  maintaining programs, programming data, customized viewing profiles, customized viewing recommendation lists and a smart audio guide package at a distribution head-end of a distributor;
  providing a viewer subsystem having an audio unit for presenting programming recommendations to a user;
  retrieving, from a recommendation subsystem at the distribution head-end, a customized viewing-recommendations list for provisioning at the viewer subsystem based upon the programming data, the customized viewing profile and viewer content selection history associated with a user of the viewer subsystem;
  generating, from the smart audio guide audio package, a plurality of smart audio guide audio clips corresponding to each program identified in the programming data at the distribution head-end; and
  implementing, at an interface device coupled to the viewer subsystem, electronic program guide smart audio guide system functions, the electronic program guide smart audio guide system functions including an electronic program guide displaying the customized viewing- recommendations list at the viewer subsystem based upon the customized viewing-recommendations list retrieved from the recommendation subsystem,
  retrieving, from the head-end of the distribution head-end, the smart audio guide audio clips corresponding to programs in the customized viewing-recommendations list; and
  uttering each of the retrieved smart audio guide audio clips at the viewer subsystem in synchronization with a corresponding visual presentation of a matching program in the customized viewing-recommendations list via the audio unit when activated to audibly identify programs in the customized viewing-recommendations list for viewing at the viewer subsystem.

* * * * *